Patented Oct. 27, 1942

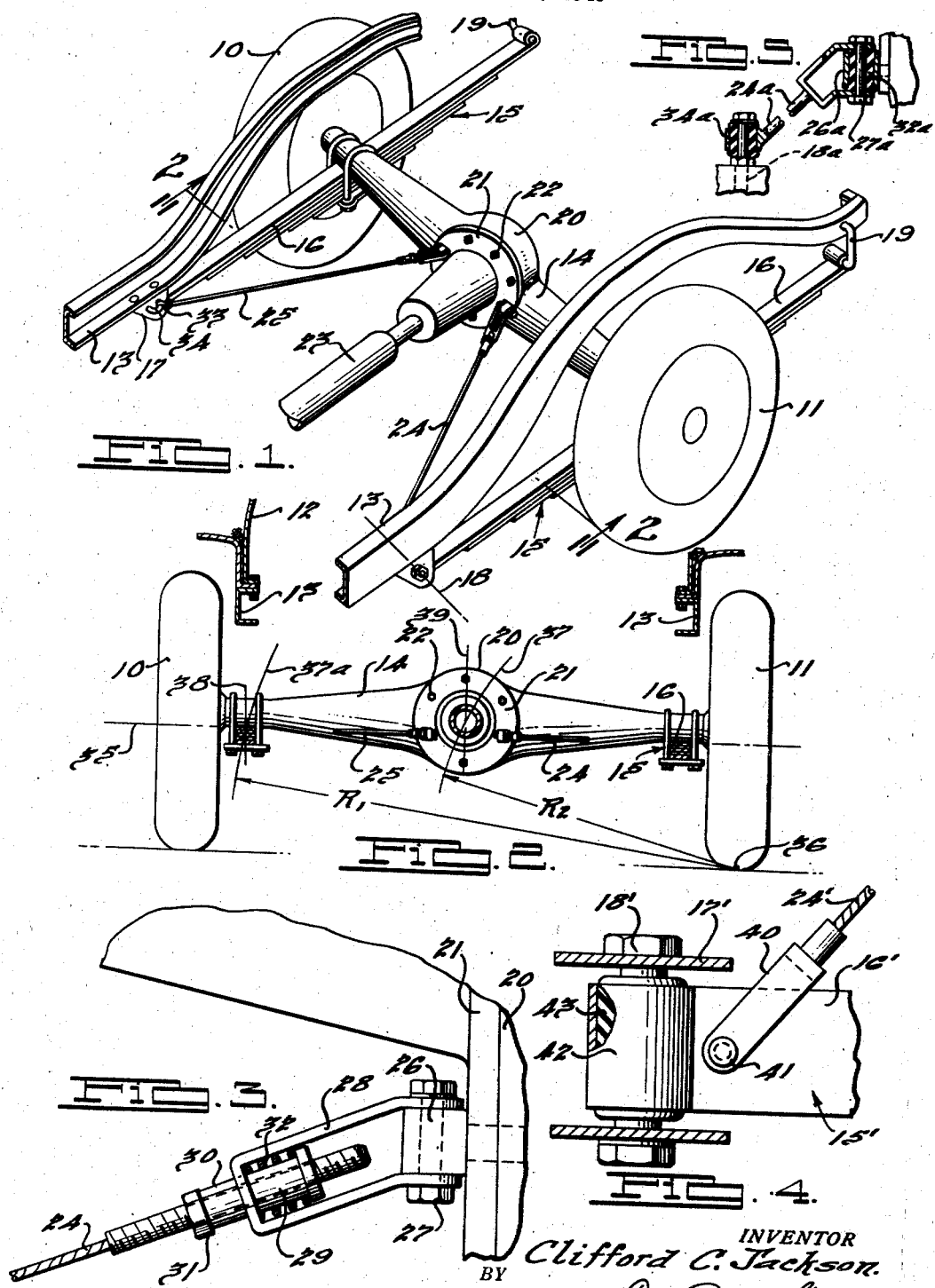

2,299,900

UNITED STATES PATENT OFFICE 2,299,900

MOTOR VEHICLE

Clifford C. Jackson, Highland Park, Mich., assignor to Chrysler Corporation, Highland Park, Mich., a corporation of Delaware Application January 11, 1940, Serial No. 313,347

7 Claims. (Cl. 280—124)

This invention relates to motor vehicles and refers more particularly to improvements in wheel suspension.

My invention has among its objects the provision of means providing improved control of the lateral displacement and oscillation of an axle and wheel assembly relative to the vehicle body structure so as to minimize what is generally known as lateral shake of the body structure.

Another object is to provide means for equalizing the relative lateral deflection between a body structure and an axle assembly so as to minimize lateral shake of the entire vehicle.

A further object is to provide an improved vehicle wheel suspension providing an improved degree of passenger riding comfort and general stability in the operation of the vehicle.

Another object is to control the inherent lateral displacement of the wheel and axle assembly relative to the frame and body structure, as one or the other of the wheels is deflected upwardly, and to damp out the resulting lateral oscillation of the axle and wheel assembly after being deflected upwardly on either side of the vehicle.

Further objects and advantages of my invention will be more apparent from the following detailed description of one embodiment thereof, reference being had to the accompanying drawing in which:

Fig. 1 is a diagrammatic perspective view of my wheel suspension system applied to the rear driving wheels of a motor vehicle.

Fig. 2 is a sectional elevational view taken as indicated by line 2—2 of Fig. 1.

Fig. 3 is an enlarged detail plan view showing the rear end attachment for one end of the controlling member.

Fig. 4 is a detail plan view illustrating a modified type of connection at the forward end of one of the control members.

Fig. 5 is a plan view illustrating a further modification.

Referring to the drawing, I have illustrated my invention in connection with a conventional system of vehicle rear wheel suspension although my invention is equally well adapted for use with front wheel suspension systems especially of the well known types employing a transverse axle and supporting leaf spring assemblies such as shown in Fig. 1 for the rear wheels 10 and 11.

In the drawing, the illustrated motor vehicle is of conventional type having the usual passenger load-carrying body 12 and supporting or load carrying chassis frame 13. The transversely extending rear axle 14 for wheels 10 and 11 yieldingly supports the vehicle body structure preferably by the leaf spring assemblies 15 which extend longitudinally of the vehicle and at opposite sides thereof. The main leaf 16 of each spring assembly is pivoted at its forward end by spring hanger 17 to frame 13 for pivoting movement about a fixed axis 18 while the rear end is swingingly connected to the frame by the usual shackle 19.

The rear axle 14 may be of generally conventional type having a central differential gearing housing portion 20 and the front cover structure 21 secured to the housing by the usual fasteners 22. The propeller shaft 23 extends from the well known engine and transmission to drive the wheels 10 and 11 through the differential gearing in axle housing portion 20.

In applying my invention to a rear axle system of the type shown in Fig. 1, I employ either compression or tension force transmitting members. I preferably employ tension members in the form of rod or cable members, such as cables 24, 25, attached at one end to axle 14 (or a part moving therewith) as near the mid-point as practicable and extending laterally outwardly and longitudinally forwardly or backwardly for attachment at their other ends to move with the body and frame structure preferably in close proximity to the pivoting ends of springs 15. Where rods are employed instead of cables, such rods may be arranged for taking tension or compression or both during the dampening action.

One manner of attaching the inner ends of the cables to the axles in instances where tension only is taken in the control members is shown in Fig. 3. In this instance I provide a support bracket 26 for each cable, this bracket being integral with cover 21 or secured thereto as illustrated by providing a threaded shank on the bracket which takes the place of one of the cover fasteners 22. Pivoted at 27 to each bracket 26 is a link 28 slidably receiving the tension adjusting member 29 threaded on the end of the cable. This adjusting member has a polygonal wrench-receiving portion 30 to facilitate its adjustment and a lock nut 31. A yielding means such as rubber or the illustrated coil spring 32 acts between link 28 and member 29 to maintain a desired tension in the cable which may be varied to best suit the variety of variables in the design of the vehicle such as the characteristics of the spring, the relationship between the sprung and unsprung masses, etc. Just by way of example, I have obtained good results in certain vehicles using cable tensions of around 150 to 200 pounds although this may be widely varied. In instances where a compression rod is employed in lieu of the cables 24, the inner end of such rod would, of course, have to act against an abutment for thrust transference to the axle, such abutment preferably being of a yielding character. Such a rod would, at times, act in tension and at times in compression as either wheel oscillates up and down. A single rod would ordinarily be sufficient in such instances and wherever a rod is used instead of a cable, such rod would preferably be of light tubular construction. Such an arrangement is shown in Fig. 5.

In the Fig. 1 arrangement each cable is formed at its outer end with an eyelet 33 freely engaging a U-shaped bracket 34 carried by spring hanger 17 disposed along pivot axis 18. By preference the inner pivots 27 are disposed approximately in the horizontal plane of the transverse neutral axis 35 of springs 15 and as closely as practicable to this axis. This axis is known to lie approximately at the main leaf 16 and along axle 14 and is the axis about which the axle rolls and the springs twist under brake torque and drive reaction. By locating pivots 27 in this manner, the cables 24, 25 move approximately as true fixed radii when both wheels rise and fall together relative to the frame structure and the generally desired geometrical functioning of the wheel suspension and driving parts is not appreciably altered.

It will thus be apparent that the lateral controlling tension members 24, 25 are attached at such points on the axle and frame structures as to pivot at the frame and swing freely with the axle as it moves up or down, and with a minimum change of length of the tension members.

In the normal operation of the illustrated conventional axle and spring assembly 14 and 15, there is an inherent lateral displacement of this assembly relative to the frame and body assembly structure as the axle is rocked from a horizontal plane, as in passing over irregularities in the road surface. This rocking of the axle and wheel assembly about the point of contact of either wheel with the road surface results in a lateral deflection of the leaf spring and a resulting lateral oscillation of the axle and wheel assembly relative to the body and frame structure. My damping device is adapted to equalize and control the relative lateral deflection between the body structure and axle assembly so as to reduce and minimize the lateral shake of the entire vehicle.

In Fig. 2 if, for example, wheel 10 meets an obstruction in the road surface, the axle 14 will swing upwardly approximately about point 36 so that the right hand spring 15 swings in arc 37ª at radius R₁ and the axle center follows arc 37 at radius R₂. These parts thus have an appreciable lateral component of movement from the normal vertical positions along lines 38, 39. As the ends of the spring 15 are secured to frame 13 and as the central portion of the frame is laterally deflected, the spring is therefore bowed or deflected laterally or in a direction transversely to that in which it normally deflects for vertical movements of the axle toward and away from frame 13. The lateral spring deflection is, of course, accompanied by the vertical deflection.

Inasmuch as the wheel tire walls in conventional practice are flexible, the axle 14 tends to set up a lateral oscillation as the spring, in the foregoing illustration, tends to whip or oscillate laterally and this in turn, without my control, gives rise to pronounced lateral shake in the vehicle body. My tension control members effectively damp out the foregoing tendency for the axle and body to set up lateral oscillation and, when the axle center moves upwardly along arc 37, the tension in cable 25 proportionately increases, the associated spring 32 accommodating the required effective increase in the cable length. At the same time, the other cable 24 in this illustration is also effective to exert a dampening influence on lateral oscillation tendency between the axle and body. The tension members may therefore be said to damp the lateral oscillation of the springs and to limit their lateral oscillations. The tension members also act to divide the total lateral displacement between the frame and axle so that the axle is not displaced laterally as much as otherwise and the body is laterally displaced somewhat more than otherwise but is not allowed to oscillate or shake, the tire side walls flexing advantageously to assist in the controlling action.

When wheel 11 is displaced upwardly relative to wheel 10, it will be apparent that a corresponding control takes place.

While I have illustrated my invention in connection with a pair of the tension control members 24, 25 arranged V-like between the frame and axle, I have found that the use of only one of the tension members is nearly as beneficial as the use of the pair so that, if desired, only one tension control member need be used in many instances and still realize a large measure of the advantages flowing from my invention.

My invention provides many advantages over conventional transverse stabilizer and radius rods. My control members are quieter in operation, less costly, less destructive on the frame, they are flexible in themselves, and they are more effective in minimizing body shake and preserving the desired geometrical relationships between the axle and body during normal operation of the vehicle.

Referring to the modification in Fig. 4, I have illustrated a different form of connection for the outer ends of the tension control members. The typical tension cable 24' has its outer end secured to a yoke 40 carrying a pivot pin 41 which passes through a vertical opening in the main leaf 16' of the spring 15' as closely as is practicable to the pivot 18' in spring hanger 17'. The leaf 16' is of course made sufficiently strong to compensate for the slight weakness introduced at pivot pin 41. The spring eye 42 preferably receives a torsion rubber bushing 43 which not only pivots spring 15' without noise but also insulates tension member 24' from the frame and body. The Fig. 4 arrangement is intended to be substituted in the Fig. 1 arrangement in lieu of the connection at 33, 34. The operation is substantially the same as before.

In the Fig. 4 and Fig. 1 arrangements the outer pivots of the control members 24, 25 are so related in association with the pivot axes 18 of the springs that axle 14 may rise and fall with the wheels 10 and 11 with natural swing about axis 18. However, the Fig. 4 arrangement has among its advantages a direct damping action of the tension control member on an associated spring by reason of the attachment thereto at 41.

Referring to Fig. 5, I have illustrated an arrangement employing a rigid dampening member 24ª of hollow tubular form instead of the cable of Figs. 1 and 4. In Fig. 5 the inner end of the cable is located just as in Fig. 1 but is now arranged for tension and compression thrust by the interposition of a yielding means such as a rubber bushing 32ª between rod 24ª and the axle-attached bracket 26ª. This bushing likewise accommodates pivoting between the rod and bracket along the axis of the fastener 27ª. At its outer end the rod 24ª preferably has a similar yielding pivotal attachment to the frame by reason of a rubber bushing 34ª carried by an outboard extension of the spring pivot bolt 18ª.

The rod 24ª is preferably unloaded axially when the vehicle is standing. If this rod is installed in place of cable 24 of Fig. 1, and cable 25 is omitted, then it will function to dampen the body shake and lateral oscillation of springs 15 just as described for the cables although in the present instance the rod 24ª will act in compression when wheel 10 rises and in tension when wheel 11 rises. I may employ two of such tubular rods at the locations of cables 24 and 25 respectively although ordinarily a single rod at the location of either cable is adequate.

The use of one or more cables, as in Fig. 1 or Fig. 4, is ordinarily preferred to the use of a rigid member or members as in Fig. 5 as such arrangement is lighter, cheaper, and less likely to be noisy or harsh.

I claim:

1. In a motor vehicle, a load-carrying structure adapted to be yieldingly supported, an axle extending transversely of the vehicle, ground wheels carried by said axle at opposite sides of the vehicle, a longitudinally extending leaf spring assembly at each side of the vehicle secured to said axle, each of said spring assemblies being shackled at one end thereof to said load-carrying structure and connected at their other ends to said load-carrying structure for pivoting on axes extending transversely of the vehicle, said leaf spring assemblies acting normally through their longitudinal flexing to support the load-carrying structure vertically on said axle and having the tendency to flex laterally in accommodating lateral oscillation of said load-carrying structure relative to said axle, a flexible control cable adapted to connect said axle with said load-carrying structure and being so constructed and arranged as to dampen tendency of the load-carrying structure to oscillate laterally when one of said wheels is displaced vertically relative to the other, means connecting the rear end of said cable with said axle at the transverse mid-region of said axle, said cable extending obliquely of the vehicle, forwardly and laterally outwardly from its said connection with said axle, for connection at its front end with said load-carrying structure in association with one of said spring pivots, means connecting the front end of said cable with said load-carrying structure in sufficiently close proximity to the pivot axis of the last said spring pivot so as not to interfere with desired free swing of said axle incident to equal rising and falling movements of both of said wheels together, and means acting to maintain said cable under predetermined tension when the vehicle is at rest on a level roadway.

2. In a motor vehicle according to claim 1, said spring pivot axes being coincident with each other and approximately passing through said cable front end connection.

3. In a motor vehicle, a load-carrying structure adapted to be yieldingly supported, an axle extending transversely of the vehicle, ground wheels carried by said axle at opposite sides of the vehicle, a longitudinally extending leaf spring assembly at each side of the vehicle secured to said axle, each of said spring assemblies comprising a leaf spring element shackled at one end thereof to said load-carrying structure and connected at its other end to said load-carrying structure for pivoting on an axis extending transversely of the vehicle, said leaf spring assemblies acting normally through their longitudinal flexing to support the load-carrying structure vertically on said axle and having the tendency to flex laterally in accommodating lateral oscillation of said load-carrying structure relative to said axle, a flexible control cable adapted to connect said axle with said load-carrying structure and being so constructed and arranged as to dampen tendency of the load-carrying structure to oscillate laterally when one of said wheels is displaced vertically relative to the other, means connecting the rear end of said cable with said axle at the transverse mid-region of said axle, said cable extending obliquely of the vehicle, forwardly and laterally outwardly from its said connection with said axle, for connection at its front end with the leaf spring element of one of said spring assemblies adjacent its said pivot axis, means connecting the front end of said cable with said one leaf spring element at a point adjacent its said pivot axis, and means acting to maintain said cable under predetermined tension when the vehicle is at rest on a level roadway.

4. In a motor vehicle, a load-carrying structure adapted to be yieldingly supported, an axle extending transversely of the vehicle, ground wheels carried by said axle at opposite sides of the vehicle, a longitudinally extending leaf spring assembly at each side of the vehicle secured to said axle, each of said spring assemblies being shackled at one end thereof to said load-carrying structure and connected at their other ends to said load-carrying structure for pivoting on axes extending transversely of the vehicle, said leaf spring assemblies acting normally through their longitudinal flexing to support the load-carrying structure vertically on said axle and having the tendency to flex laterally in accommodating lateral oscillation of said load-carrying structure relative to said axle, a pair of V-arranged flexible control cables adapted to connect said axle with said load-carrying structure and being so constructed and arranged as to dampen tendency of the load-carrying structure to oscillate laterally when one of said wheels is displaced vertically relatively to the other, means connecting the rear end of each of said cables with said axle at the transverse mid-region of said axle, each of said cables extending obliquely of the vehicle, forwardly and laterally outwardly from its said connection with said axle, for connection at its front end with said load-carrying structure in association with one of said spring pivots, means connecting the front ends of said cables with said load-carrying structure respectively in sufficiently close proximity to the pivot axes of said spring pivots so as not to interfere with desired free swing of said axle incident to equal rising and falling movements of both of said wheels together, and means acting to maintain each of said cables under predetermined tension when the vehicle is at rest on a level roadway.

5. In a motor vehicle, the combination with a vehicle frame, of road wheels associated with said frame, axle means carrying said road wheels, means yieldingly supporting said road wheels and axle means on said frame for rising and falling movement with respect thereof, means having connection with said axle means and frame for controlling the relative movements of said frame and axle means, said last named means comprising a pair of forwardly diverging flexible cables connected at the rear ends thereof with said axle means and at the forward ends thereof with said frame, and means acting to maintain each of said cables under predetermined tension when the vehicle is at rest on a level roadway.

6. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, a pair of flexible cables having their opposite ends respectively connected to the axle and the vehicle frame, said cables being forwardly divergent from the axle to the vehicle frame and lying substantially in the plane of the springs, and means acting to maintain each of said cables under predetermined tension when the vehicle is at rest on a level roadway.

7. In a motor vehicle, in combination, a frame, a rigid axle carrying road wheels on opposite sides of the vehicle, longitudinally disposed leaf springs between each end of the axle and the vehicle frame having their forward ends pivotally connected to the vehicle frame and their rearward ends shackled to the vehicle frame, a pair of flexible cables having their opposite ends respectively connected to the axle and the vehicle frame; said cables being forwardly divergent from the axle to the vehicle frame and lying substantially in the plane of the springs, the cables being connected to the vehicle frame at points adjacent the pivotal connections of the springs to the frame, and to the axle towards its middle, and means acting to maintain each of said cables under predetermined tension when the vehicle is at rest on a level roadway.

CLIFFORD C. JACKSON.